(12) United States Patent
McClanahan et al.

(10) Patent No.: US 12,343,880 B2
(45) Date of Patent: Jul. 1, 2025

(54) END EFFECTOR BUMP DETECTOR

(71) Applicant: Texas Instruments Incorporated, Dallas, TX (US)

(72) Inventors: Adolphus Edward McClanahan, Dallas, TX (US); Anthony Wayne Myers, Plano, TX (US); Ronald Tracy White, Plano, TX (US); John Keith Bentley, Irving, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 204 days.

(21) Appl. No.: 17/146,098

(22) Filed: Jan. 11, 2021

(65) Prior Publication Data

US 2021/0129337 A1  May 6, 2021

Related U.S. Application Data

(62) Division of application No. 14/973,350, filed on Dec. 17, 2015, now abandoned.

(51) Int. Cl.
*B25J 9/16* (2006.01)
(52) U.S. Cl.
CPC ... *B25J 9/1676* (2013.01); *G05B 2219/39505* (2013.01)
(58) Field of Classification Search
CPC ............ B25J 9/1676; B25J 9/1694; G05B 2219/39505
See application file for complete search history.

(56) References Cited

U.S. PATENT DOCUMENTS

| | | | | |
|---|---|---|---|---|
| 4,591,944 | A * | 5/1986 | Gravel | B25J 13/085 361/170 |
| 4,821,584 | A * | 4/1989 | Lembke | G01L 1/16 73/862.68 |
| 6,298,283 | B1 | 10/2001 | Kato et al. | |
| 7,458,763 | B2 * | 12/2008 | van der Meulen | H01L 21/67742 414/217 |
| 9,651,433 | B2 * | 5/2017 | Matsuzawa | G01L 5/009 |
| 9,724,825 | B2 | 8/2017 | Iwatake | |
| 10,247,837 | B2 * | 4/2019 | Châtenay | E21B 49/00 |
| 10,696,489 | B2 * | 6/2020 | Harnesk | B65G 43/10 |
| 2010/0129940 | A1 * | 5/2010 | Little | G01H 11/06 73/649 |
| 2012/0048027 | A1 | 3/2012 | Hashiguchi et al. | |
| 2014/0277868 | A1 * | 9/2014 | Hillman, Jr. | B60L 15/20 701/22 |
| 2014/0379128 | A1 | 12/2014 | Ishikawa et al. | |
| 2016/0250750 | A1 | 9/2016 | Kuroshita | |
| 2020/0000536 | A1 * | 1/2020 | Yakimovich | B25J 9/1676 |

* cited by examiner

*Primary Examiner* — Patrick H Mackey
(74) *Attorney, Agent, or Firm* — Ronald O. Neerings; Frank D. Cimino

(57) ABSTRACT

A system and method is described for detecting abnormal contacts and misalignment of end effector of a robot arm during robotic arm operation. A contact shock transients sensing unit detects signals on the robot arm and generates alarms, identifies the location of the contact shock transients in the robot arm operation, and controls robot arm operation to prevent further damage to the robot arm and articles handled by the robot arm.

17 Claims, 2 Drawing Sheets

END EFFECTOR BUMP DETECTOR

CROSS-REFERENCE TO RELATED APPLICATIONS

This application is a divisional of and claims the benefit to U.S. patent application Ser. No. 14/973,350 filed on Dec. 17, 2015, the contents of all are incorporated herein by reference.

TECHNICAL FIELD

This disclosure relates generally to the field of robotic applications and more specifically to robotic arm bump detection in manufacturing.

BACKGROUND

Robots are used in industrial applications to perform various tasks including ones that require precision handling. Typically, manufacturing robots have an arm with an end effector mechanisms or gripper mechanisms that is used for gripping an article at one location, transporting the article to another location, and then releasing the article. These robots are very effective in facilitating precision manufacturing operations and saving labor costs with respect to manual operations that may cause errors in handling certain operations. For operations requiring precision handling, end effector of robot arm needs to be calibrated accurately to ensure articles handled by robot arm are handled as desired with proper alignment of end effector with the article. Any misalignment of end effector can cause damage to articles or even the robot arm.

Robots are used in semiconductor manufacturing for various operations including transporting semiconductor wafers in clean room during various manufacturing stages including placing wafer in a contained area. Wafers are very delicate and it is important that robots move wafers at high speed between various stages without causing damage to wafers. A minor misalignment of end effector of robot arm can cause semiconductor wafer to bump or strike contain area or other structures around the robot arm end effector resulting in chipped, fractured, damaged, or broken wafer. Minor chipping and micro fracture of wafers are difficult to detect and can result in significant yield problems for semiconductor devices that are based on the damaged wafers.

Minor misalignments of end effectors of robot arm cause bumps that are difficult to detect and result in micro fractures in wafer. Many areas in clean room cannot be visually inspected and thus makes it difficult to determine the process stage at which mechanical contact or bump of wafers are occurring especially, when wafers are transferred in a cassette. For example, a minor misalignment of end effector can cause wafers to bump the interior of a cassette, which cannot be visually inspected and can result in fractured wafers. Typically, to detect bumps and misalignments of end effectors, expensive cameras and delicate pressure sensors are used. These methods are very expensive and because robotic arms are utilized in almost every stage of manufacturing, it is cost prohibitive to use these methods for every end effector and are thus not used for every stage of manufacturing process. Therefore, a system and method is needed to detect abnormal wafer contact during manufacturing process and assist in the maintenance of end effector alignment.

SUMMARY

In accordance with an embodiment an apparatus is disclosed. the apparatus includes a contact shock transients sensing unit coupled to a robot arm and configured to detect contact shock transients on the robot arm, and generate a signal corresponding to contact shock transients; and a control unit coupled to the contact shock transients sensing unit, the control unit is configured to measure an amount of the signal generated, determine whether the amount of the signal exceeds one or more predetermined thresholds, and execute one or more predetermined operations based on the determination.

In accordance with some embodiment a method is disclosed. The method includes detecting contact shock transients generated by a robot arm, generating a signal corresponding to contact shock transients, measuring an amount of the signal, determining whether the amount of the signal exceeds one or more predetermined thresholds, and executing one or more predetermined operations based on the determination.

In accordance with some embodiment a system is disclosed. The system includes a robot control unit, configured to control movement of a robot arm, a contact shock transients sensing unit coupled to the robot arm and configured to detect contact shock transients generated on the robot arm, and generate a signal corresponding to the contact shock transients, and a processing unit coupled to the contact shock transients sensing unit, the processing unit is configured to measure an amount of the signal generated, determine whether the amount of the signal exceeds one or more predetermined thresholds, and execute one or more predetermined operations based on the determination.

DETAILED DESCRIPTION

The following description provides many different embodiments, or examples, for implementing different features of the subject matter. These descriptions are merely for illustrative purposes and do not limit the scope of the invention.

Figure 1:
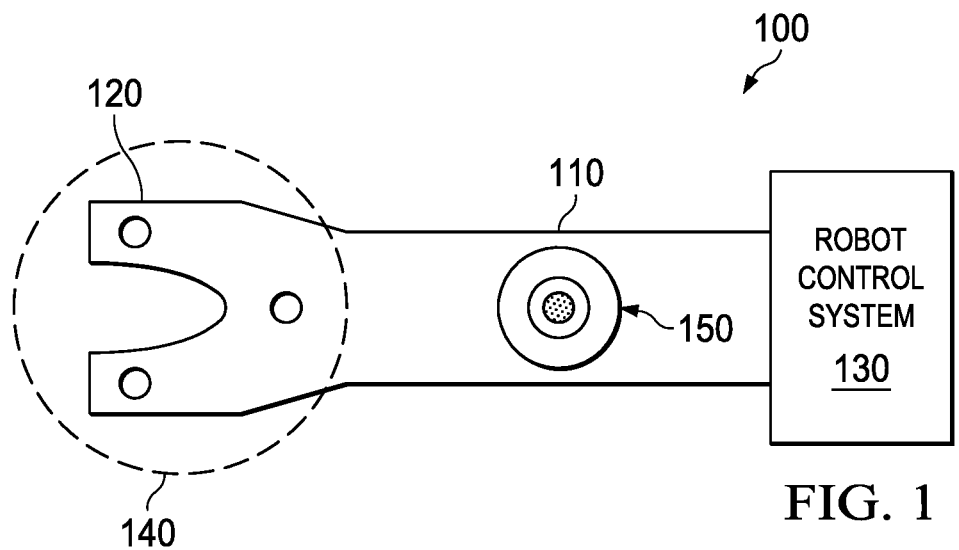
FIG. 1 illustrates an exemplary robotic system for transporting semiconductor wafers according to some embodiment.

Referring to FIG. 1, an exemplary robotic system 100 for transporting semiconductor wafers during manufacturing process is illustrated according to some embodiment. System 100 includes a robotic arm 110 with an end effector 120. Robotic arm 110 is associated with a robot control system 130. Robot control system 130 can be part of a manufacturing system configured to perform various functions including moving and controlling robotic arm 110 through various manufacturing stages to perform various tasks including transporting articles. In the exemplary embodiment, the robotic arm 110 is configured to transport a semiconductor wafer 140 (shown in dashed lines) during manufacturing process including setting wafer 140 in semiconductor cassettes. The size of the end effector 120 of robotic arm 110 can be configured according to the size of the semiconductor wafer 140.

According to an embodiment, the robotic arm 110 includes a contact shock transients sensing unit 150 configured to detect contact shock transients generated by deflections, bumps, external contacts, or the like of the robotic arm 110. The contact shock transients sensing unit 150 can be any contact shock transients sensing element. In an embodiment, the contact shock transients sensing unit 150 is a piezoelectric sensor configured to detect contact shock transients that occur on semiconductor wafer 140 and end effector 120 due to certain abnormal or abrupt mechanical contact, shock, vibration, or the like caused by surrounding structures. The piezo electric sensors are typically configured to generate electrical pulses proportional to an amount of contact force, pressure, acceleration of sensors, temperature, or strain experienced by piezo electric sensors. Depending on the sensitivity of piezo electric sensor, electrical pulses can be measured to determine even minute contact shock transients.

During normal operation, the robotic arm 110 continuously moves to perform various tasks. These normal movements cause certain amount of normal contact shock transients. These normal contact shock transients can be measured by the contact shock transients sensing unit 150 and can be used as typical normal baseline contact shock transient thresholds for measurement purposes. The amount of measured contact shock transients in the robotic arm 110 can vary depending on the location of sensors on the robotic arm 110 or specific process stage where the robotic arm 110 is moving. The contact shock transients sensing unit 150 can be placed anywhere on the robotic arm 110 based on the type and amount of contact shock transients to be measured. Thus, the value of normal contact shock transient thresholds will also depend on the location of contact shock transients sensing unit 150 on the robotic arm 110 and the specific manufacturing process stage of the robotic arm 110.

In an embodiment, the contact shock transients sensing unit 150 may be placed closer to wafer landing area on the end effector 120 to increase the detectability of minor shock transients generated by wafer 140 by either bumping into or making abnormal contact with surrounding structure, container, cassette, or the like. The measured electrical output of piezo electric sensors of contact shock transients sensing unit 150 can be calibrated based on the location of the contact shock transients sensing unit 150 on the robotic arm 110 and normal contact shock transient thresholds for each stage of manufacturing process can be measured accordingly. For example, when the contact shock transients sensing unit 150 is placed closer to wafer landing area on end effector 120, then during normal operation, it detects certain amount of normal shock transients and generates electrical pulses representing the normal operation of the robotic arm 110 at each stage of the process. The electrical pulses generated at a given process stage can be used as normal contact shock transient threshold for contact shock transients sensing unit 150 at that process stage.

Figure 2A:
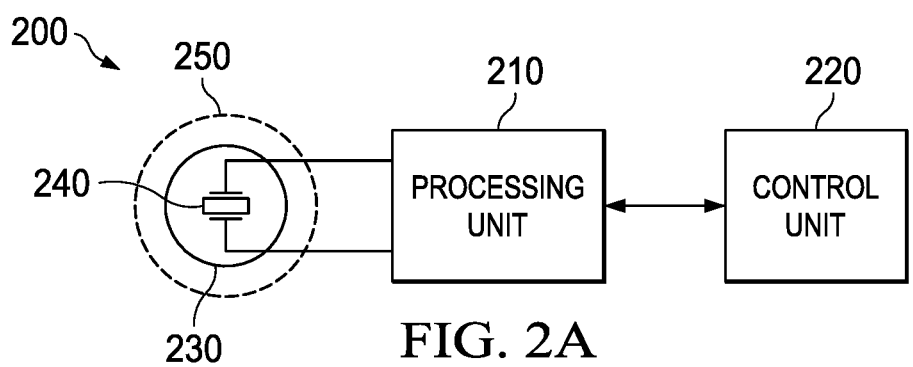
FIG. 2A illustrates an exemplary block diagram of a system for detecting bumps for end effector of a robotic arm according to some embodiment.

During regular operation, if the wafer 140, end effector 120, robotic arm 110, or other system element makes abnormal contact with or bumps into any other surrounding structure due to any reason such as misalignment of end effector, misplacement of wafer, or others, then the robotic arm 110 will generate additional contact shock transients corresponding to the additional amount of force generated by the contact or bump. These additional contact shock transients can be measured by the contact shock transients sensing unit 150 in the form of additional electrical pulses over the normal threshold contact shock transients. The additional electrical pulses generated over the normal threshold output of the contact shock transients sensing unit 150 can be an indication of additional movement, shock, contact, or similar event in the system 100. This indication then can be used to determine the nature of the contact, place of contact in the manufacturing process, and whether it may have caused any damage to the wafer 140 itself, or make other determinations Referring to FIG. 2A, an exemplary block diagram of system 200 for detecting bumps for end effector 120 of robotic arm 110 is illustrated according to some embodiment. System 200 includes a processing unit 210, a control unit 220, and a contact shock transients sensing unit 230. The processing unit 210 can be any type of processor configured to read, process, and output data such as general purpose microprocessor, microcontroller, special purpose controllers, digital signal processors, or the like. Even though the processing unit 210 is shown as a separate unit; however, the processing unit 210 can be part of the control unit 220. The control unit 220 can be any unit configured to program and control processing unit 210 and process data received from it. In alternative, the processing unit 210 can process data for the control unit 220. The control unit 220 can include many others elements, (not shown) such as, a display, an alarm unit, keyboard, printer, wireless/wireline transmission unit, and other similar units for processing and reporting data received from the processing unit 210. The control unit 220 can be a computer system or special purpose robot control unit or the like.

In an exemplary embodiment, the contact shock transients sensing unit 230 includes a piezo quartz crystal 240 that can be configured to sense change in force, pressure, acceleration of robotic arm, temperature, strain, or the like and generate electrical signals corresponding to the input sensed. As stated hereinabove, the contact shock transients sensing unit 230 can include any type of sensing element configured to sense contact shock transients such as generated by the application of force, pressure, stress, etc. and provide data in form of electrical or electromagnetic signals. The contact shock transients sensing unit 230 can be placed on any suitable platform such as an exemplary diaphragm 250 shown in dashed line or it can be placed directly on the robotic arm 110 or end effector 120 of robotic arm 110. During normal operation, the contact shock transients sensing unit 230 senses contact shock transients on robotic arm 110 and end effector 120 at various stages of the manufacturing operation and generates electrical signals corresponding to it. The processing unit 210 measures and processes the electrical signals from contact shock transients sensing unit 230 and forwards the processed data to control unit 220. While for exemplary embodiments, electrical signals are used to measure contact shock transients; however, the measurement of contact shock transients is not limited in any way to electrical signals for example, the contact shock transients can be measured using electromagnetic waves, light pulses, vibrations, change in environmental conditions, or the like.

The control unit 220 can perform various functions based on the data received from the processing unit 210. For example, after analyzing the data, the control unit 220 may determine that the contact shock transient signals are within the threshold limits of the robotic arm 110 at each stage of the process and do nothing, or it can signal normal mode of operation (via LED, colored signals, etc.) or the like. If the control unit 220 determines that the contact shock transient signals received are above a threshold for any given process stage, then the control unit 220 can identify the process stage where the above threshold contact shock transient signals were generated and determine whether it may have caused any damage to the wafer. The control unit 220 can be programmed to generate various types of alarms based on the type of the contact shock transient signals detected and can even stop robot control to prevent further damages to other wafers. Various other types of control functions can be performed by the control unit 220 based on any particular given application.

Figure 2B:
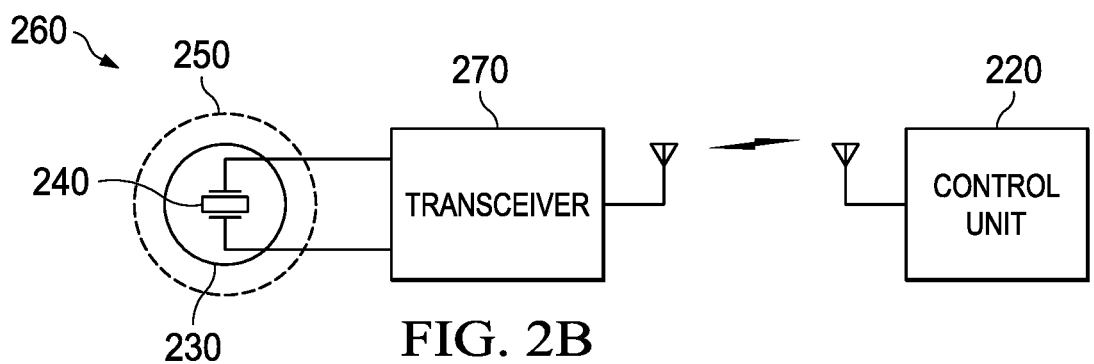
FIG. 2B illustrates an alternative exemplary block diagram of system for detecting bumps for end effector of a robotic arm according to some embodiment.

Referring to FIG. 2B, an alternative exemplary block diagram of system 260 for detecting contact shock transients is illustrated according to some embodiment. In system 260, the processing unit 210 can be replaced by a transceiver unit 270 configured to process and transmit/receive signals via wireless communication to/from the control unit 220, which is also equipped with an antenna to transmit/receive signals from the transceiver 270. The transceiver 270 can process signals received from the contact shock transients sensing unit 230 (amplify, modulate, store, forward, etc.) and transmit them to the control unit 220. The control unit 220 can include a processing unit to process data received from the transceiver unit 270. Signals can be transmitted using any conventional wireless transmission protocols. This alternate configuration allows the placement of contact shock transients sensing unit 230 on robot arms where traditional wireline communication may not be feasible. For simplification, one control system is shown for a robot arm; however, a control system can be programmed to receive contact transient signals from multiple robot arms and generate a comprehensive signal and alarm report giving details of all events. Further the control system 220 can be programmed to indicate contact transient signal alarms on a system map showing the exact location and the process stage where the contact transient signals were generated.

Figure 3:
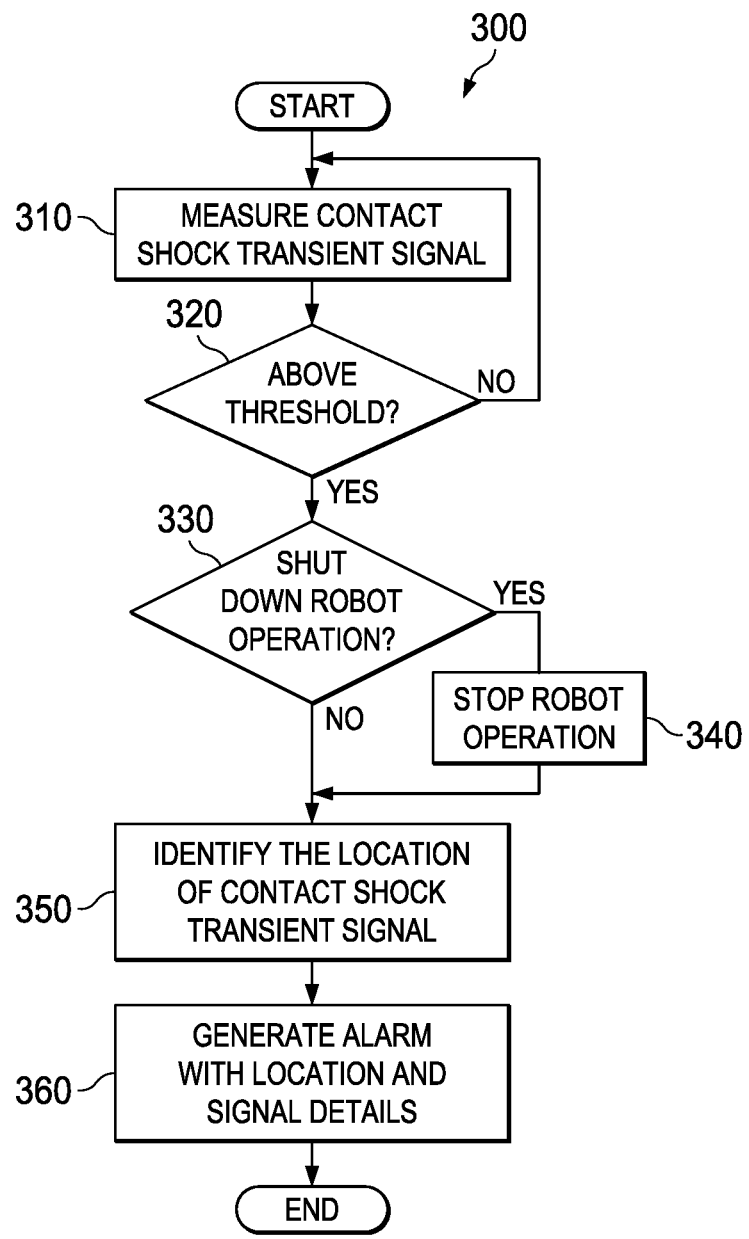
FIG. 3 illustrates an exemplary flow diagram of a method for detecting bumps for end effector of a robotic arm according to some embodiment.

Referring to FIG. 3, an exemplary flow diagram of a method 300 for detecting contact shock transients of a robotic arm is illustrated according to some embodiment. At the beginning, at 310 the system measures contact shock transient signals from contact shock transients sensing unit. As explained hereinabove, contact shock transient signals can be measured using various methods and elements. At 320, the system determines if the detected contact shock transients signal is above any given predetermined threshold. The predetermined thresholds can be set based on either the signal level measured or can be programmed based on various locations within the process where the signal was generated or a combination thereof. For example, the robotic arm can generate different normal contact shock transients at different stages of the process based on the function performed during any particular given process stage. The system can measure contact shock transient signals at each stage of the process and compare the received signal with specific predetermined thresholds for that particular process stage. Thresholds for each process stage and others can be determined during some initial calibration stage of the system. The system can maintain a list or table of predetermined thresholds for each process stage and perform checks/comparisons, as the robotic arm moves through each stage of the process, and generate the result of comparison in the form of indication signals, alarms, reports, etc.

If the system determines that the contact shock transients signal is not above any given threshold, then the system continues to measure the contact shock transients signal data. If the system determines that the contact shock transients signal is above a threshold for a given particular process stage, then at 330 the system determines if the signal is severe enough to shut down the robot operation. The severity of signal can be determined based on the comparison of measurements of contact shock transient signals during normal operation and calibration process. For example, during the normal operation if contact shock transient signals are determined to be at certain level, then depending on the movement of the robot arm at a particular process stage, it can be determined if the robot arm, wafer, end effector, or other system element makes an abnormal contact, bump, or the like with any surrounding structure, then what level of change in the contact shock transients signal will impact the wafer or robotic arm. Based on that determination, the system can be programmed to set various levels of contact shock transients signal severity.

When the system determines that the deflection signal is severe enough to require shutting down the robotic operation, then the system shuts down the robot arm and proceeds to generate alarms and reports. When the system determines that the deflection signal is not severe enough to shut down the robot operation, it proceeds to 350 to identify the process stage at which the contact shock transients signal crossed the threshold. The system then generates alarms and reports for user to take appropriate actions based on the alarms and reports. As explained hereinabove, the control system can be programmed to indicate contact shock transients signal alarms on a system map showing the exact location of the contact shock transients signal and the process stage where the signal was generated.

Although terms such as contact, bump, deflection, etc. are used to refer to incidents where the robot arm, end defector, wafer, and other elements of the system come into an abnormal contact with surrounding structures or containers or create abnormal contact shock transients; however, the term is not limited as such. For example, any type of abnormal contact or vibration other than the one generated during normal operation to robot arm, end effector, wafer, and other elements of the system can generate shock transients that can exceed predetermined thresholds and can be measured and determined by the apparatus, system, and method describe herein. Other terms that can be used to refer to events that can generate abnormal shock transients can include but not limited to bang, bounce, crash, jerk, knock, rattle, shake, slam, thump jolt, strike and the like.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus comprising:
 a contact shock transients sensing unit coupled to an end effector of a robot arm configured to carry a semiconductor wafer and configured to:
  detect contact shock transients on the robot arm, and
  generate a signal corresponding to contact shock transients; and
 a control unit coupled to the contact shock transients sensing unit, the control unit is configured to:
  measure an amount of the signal generated,
  determine whether the amount of the signal exceeds one or more predetermined thresholds, and
  execute one or more predetermined operations based on the determination, wherein the predetermined operation includes identifying a location of the robot arm in a manufacturing process where the amount of the signal exceeds the one or more predetermined thresholds.

2. The apparatus of claim 1, wherein the contact shock transients sensing unit is coupled to the control unit via a wireless communication.

3. The apparatus of claim 1, wherein the contact shock transients sensing unit is further configured to detect contact shock transients generated by a pressure.

4. The apparatus of claim 1, wherein the contact shock transients sensing unit comprises a piezo electric sensor.

5. The apparatus of claim 4, wherein
 the piezo electric sensor generates electrical signals corresponding to contact shock transients,
 the piezo electric sensor is mounted on a diaphragm, and
 the diaphragm is coupled to the robot arm.

6. The apparatus of claim 1, wherein
 the end effector of the robot arm is configured to carry a semiconductor wafer.

7. The apparatus of claim 1, wherein the contact shock transients sensing unit is further configured to detect contact shock transients generated by an acceleration of sensors on the robot arm.

8. The apparatus of claim 1, wherein the contact shock transients sensing unit is further configured to detect contact shock transients generated by a strain experienced by sensors on the robot arm.

9. The apparatus of claim 1, wherein the contact shock transients sensing unit is further configured to detect contact shock transients generated by a temperature experienced by sensors on the robot arm.

10. A method comprising:
 detecting contact shock transients generated by a robot arm;
 generating a signal corresponding to the detected contact shock transients;
 measuring an amount of the signal;
 determining whether the amount of the signal exceeds one or more predetermined thresholds; and
 executing one or more predetermined operations based on the determination, wherein the predetermined operation includes identifying a location of the robot arm in a manufacturing process where the amount of signal exceeds one or more predetermined thresholds.

11. The method of claim 10, wherein
 the contact shock transients are detected by a contact shock transients sensing unit coupled to the robot arm at an end effector of the robot arm, and
 the end effector is configured to carry a semiconductor wafer.

12. The method of claim 11, wherein the contact shock transients sensing unit comprises a piezo electric sensor.

13. The method of claim 12, wherein
 the piezo electric sensor generates electrical signals corresponding to contact shock transients,
 the piezo electric sensor is mounted on a diaphragm, and
 the diaphragm is coupled to the robot arm.

14. The method of claim 12, wherein the contact shock transients of the robot arm are generated by a pressure.

15. The method of claim 11, wherein the contact shock transients sensing unit is further configured to detect contact shock transients generated by an acceleration of sensors on the robot arm.

16. The method of claim 11, wherein the contact shock transients sensing unit is further configured to detect contact shock transients generated by a strain experienced by sensors on the robot arm.

17. The method of claim 11, wherein the contact shock transients sensing unit is further configured to detect contact shock transients generated by a temperature experienced by sensors on the robot arm.

* * * * *